(12) United States Patent
Gokaraju et al.

(10) Patent No.: US 8,219,759 B2
(45) Date of Patent: Jul. 10, 2012

(54) ADAPTIVE DISPLAY CACHING

(75) Inventors: Ravi kiran Gokaraju, Hyderabad (IN);
Sudhir Reddy Nathaala, Pedda Amberpet (IN)

(73) Assignee: Novell, Inc., Provo, UT (US)

( * ) Notice: Subject to any disclaimer, the term of this patent is extended or adjusted under 35 U.S.C. 154(b) by 786 days.

(21) Appl. No.: 12/404,423

(22) Filed: Mar. 16, 2009

(65) Prior Publication Data
US 2010/0235583 A1 Sep. 16, 2010

(51) Int. Cl.
*G06F 12/02* (2006.01)

(52) U.S. Cl. ... 711/133; 711/108; 711/162; 711/E12.07; 711/E12.103

(58) Field of Classification Search .................. 711/108, 711/162, 133
See application file for complete search history.

(56) References Cited

U.S. PATENT DOCUMENTS

| | | | |
|---|---|---|---|
| 5,043,919 A * | 8/1991 | Callaway et al. | 715/733 |
| 7,313,764 B1 | 12/2007 | Brunner et al. | |
| 7,447,997 B2 | 11/2008 | Colle | |
| 7,667,707 B1 * | 2/2010 | Margulis | 345/519 |
| 7,847,755 B1 * | 12/2010 | Hardebeck et al. | 345/2.2 |

FOREIGN PATENT DOCUMENTS

EP 0375141 A3 6/1990

* cited by examiner

*Primary Examiner* — Kenneth Lo
(74) *Attorney, Agent, or Firm* — Schwegman, Lundberg & Woessner, P.A.

(57) ABSTRACT

Apparatus, systems, and methods may operate to send a window copy message including changed window identification information to a remote node when metadata associated with a changed foreground window at a local node has been cached, and otherwise, to locally cache the window metadata and send the window metadata and window pixel data to the remote node. When a preselected minimum bandwidth connection is not available between the local node and the remote node, additional operations may include sending a rectangle paint message including changed rectangle identification information to the remote node when rectangle metadata associated with a changed rectangle of a designated minimum size at the local node has been cached, and otherwise, to locally cache the rectangle metadata and send the rectangle metadata and rectangle pixel data to the remote node. Additional apparatus, systems, and methods are disclosed.

23 Claims, 4 Drawing Sheets

ADAPTIVE DISPLAY CACHING

BACKGROUND

Remote network access to computer desktops sometimes involves transferring large amounts of data between the controlling desktop (e.g., the client) and the controlled desktop (e.g., the server). For example, this situation is common when the data comprises a representation of the controlled desktop screen graphics. Since this type of remote control operation ideally occurs in near-real time, performance speed can be important to the user.

Some techniques have been designed to reduce the amount of information communicated between the two desktops. Two examples include Remote Frame Buffer (RFB) caching, and Virtual Network Computing remote X-server session access (x11vnc) caching. RFB caching can be inefficient when entire windows are cached, even though only small changes occur within the cached window. x11vnc caching, which can operate on smaller portions of a window, is often memory-intensive in nature.

SUMMARY

In various embodiments, apparatus, systems, and methods that support adaptive display caching operations are provided. For example, in some embodiments, these operations are implemented by sending a window copy message including changed window identification information to a remote node when window metadata associated with a changed foreground window at a local node has been cached. When the window metadata has not been cached, operations may include locally caching the window metadata and sending the window metadata and window pixel data to the remote node without locally caching the window pixel data.

When a preselected minimum bandwidth connection is not available between the local node and the remote node, additional operations may include sending a rectangle paint message including changed rectangle identification information to the remote node when rectangle metadata associated with a changed rectangle of a designated minimum size at the local node has been cached. When the rectangle metadata has not been cached, operations may include locally caching the rectangle metadata and sending the rectangle metadata and rectangle pixel data to the remote node without locally caching the rectangle pixel data. In some embodiments, the local node comprises a server device, and the remote node comprises a client device. Additional embodiments are described, and along with the foregoing examples, will be set forth in detail below.

DETAILED DESCRIPTION

Some of the challenges described above may be addressed by using a multi-stage approach to caching displayed data. For example, in many embodiments, caching operations are based on the nature of the screen changes that occur, as well as the underlying network bandwidth. Dynamic adjustments can be made to increase the number of cache hits using a reduced number of system resources. For example, a two-stage approach may be implemented: a first stage to deal with caching images on a window level, and a second stage to divide windows up into rectangles to strike a balance between the cache hit ratio and the amount of memory used by cache buffers.

The first stage, which uses a window-based caching approach, can be used to intelligently maintain the caching buffer so that only the windows which have an increased chance of getting a cache hit are stored. The second stage, which operates to cache portions of windows as rectangles (e.g., 16×16 rectangles), can operate to set the number of rectangles to be stored dynamically—based on the network bandwidth. This improves the cache hit ratio and can dramatically reduce duplication of information stored in the cache buffer when less than an entire window is changed.

For the purposes of this document, the term "Virtual Network Computing" (VNC) refers to a client/server software package that operates to provide remote network access to graphical desktops. A "VNC system" comprises a client, a server, and a communication protocol.

A "VNC client" (sometimes called a VNC Viewer) comprises the client portion of a VNC system. The VNC client provides the actual display of the graphical desktop on a remote machine. The VNC client may operate to periodically request updates of the screen (e.g., the frame buffer) in the form of a request, called the FrameBufferUpdateRequest (FBUR).

The "VNC server" comprises the server portion of a VNC system, comprising a process (e.g., running on a local or remote machine) that operates to send screen updates in response to the FBUR. This response is sometimes called the FrameBufferUpdate (FBU). The FBU may comprise information concerning only the changed portion of the display, divided into various small rectangles. These rectangles can be encoded according to various standards to reduce the amount of data transferred between the VNC server and client.

On the VNC server, the mirror driver may be used to detect modified areas on the VNC server screen. Once a change is detected, the VNC protocol used in the RFB from the server to the client can be very simple, perhaps based on a single graphic primitive (e.g., the RFB may comprise the instruction "Put a rectangle of pixel data at the specified X,Y position", perhaps using the Windows® Copyrect function) for stage 1, and event messages (e.g., comprising graphic primitives for 16×16 image rectangles) for stage 2.

Thus, in many embodiments, the client operates to connect to the server, and once the connection is made, the client sends the entire display (e.g., the desktop) to the server without caching. Thereafter, the client sends periodic requests to the server (e.g., FBURs), and the server responds with update information (e.g., FBUs). Requests received at the server can trigger polling the mirror driver to get changes; the requests are typically sent by the client as soon as client has completed implementing changes indicated by the prior FBU.

Using the FBU, the server can send changes to the client via different mechanisms. The server can determine what is changed by calling the mirror driver (if used) to get changes since the last FBUR was sent, or by using an algorithm to determine changes since the last FBUR was sent. A group of desktop windows and/or rectangles to be changed can thus be identified. Other graphic change detection mechanisms may be used as well.

The status of each window may be obtained (e.g., using its attributes) by iterating through all windows to determine whether each window has moved, or been maximized/minimized. In any of these cases, stage 1 of the two-stage process can be performed.

A multimap can be used in conjunction with the window cache buffer: the handle of the changed window may comprise a pointer indicating whether the changed window is cached or not. If the window has moved, and it has been cached, the handle and destination location can be sent to the client. For example, the Copyrect function may result in efficient encoding when an object, such as an entire window, is being moved. The only data sent is the location of a rectangle (e.g., a window) from which data should be copied to the current location. The Copyrect function can also be used to efficiently transmit a repeated pattern.

If the window has been minimized and is cached, the handle, destination x,y location, and window pixels are stored by the client. If the window is minimized and not cached (e.g., no cache hit), the handle, window metadata, and current window state (but not the window pixel data) are cached at the server. The client receives the window handle, x,y location, and all window pixels for decoding, display, and caching.

When the window is closed, the window is purged from the server cache and a synchronization message with a list of window handles to be removed from the client cache is sent from the server to the client Stage 2 of the two-stage process occurs when the bandwidth of the connection between the server and client is less than some preselected bandwidth, such as less than two megabits per second, or less than one megabits per second, and when rectangles have been changed without a cache hit.

The input to stage 2 are those rectangles that have been determined as changed, either by the mirror driver or by an algorithm on the server, excluding what has already been sent via cache hits occurring at stage 1. Even if there are no cache hits in stage 1, windows that are changed may be processed as rectangles during stage 2.

In stage 2, rectangles that are changed (i.e., anything less than an entire window that is neither moved, minimized, or maximized), can be divided into smaller component parts, such as 16×16 rectangles. These, in turn, can be cached, perhaps using an adaptive replacement cache algorithm.

Thus, the Copyrect function can be used in stage 1 for window-level caching (or smaller rectangles if there is sufficient bandwidth between the server and client, such as when there is more than some preselected minimum bandwidth). If there is insufficient bandwidth (e.g., a bandwidth that is less than some preselected amount), RFB caching can be used for smaller rectangles as part of stage 2.

Therefore, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Figure 1:
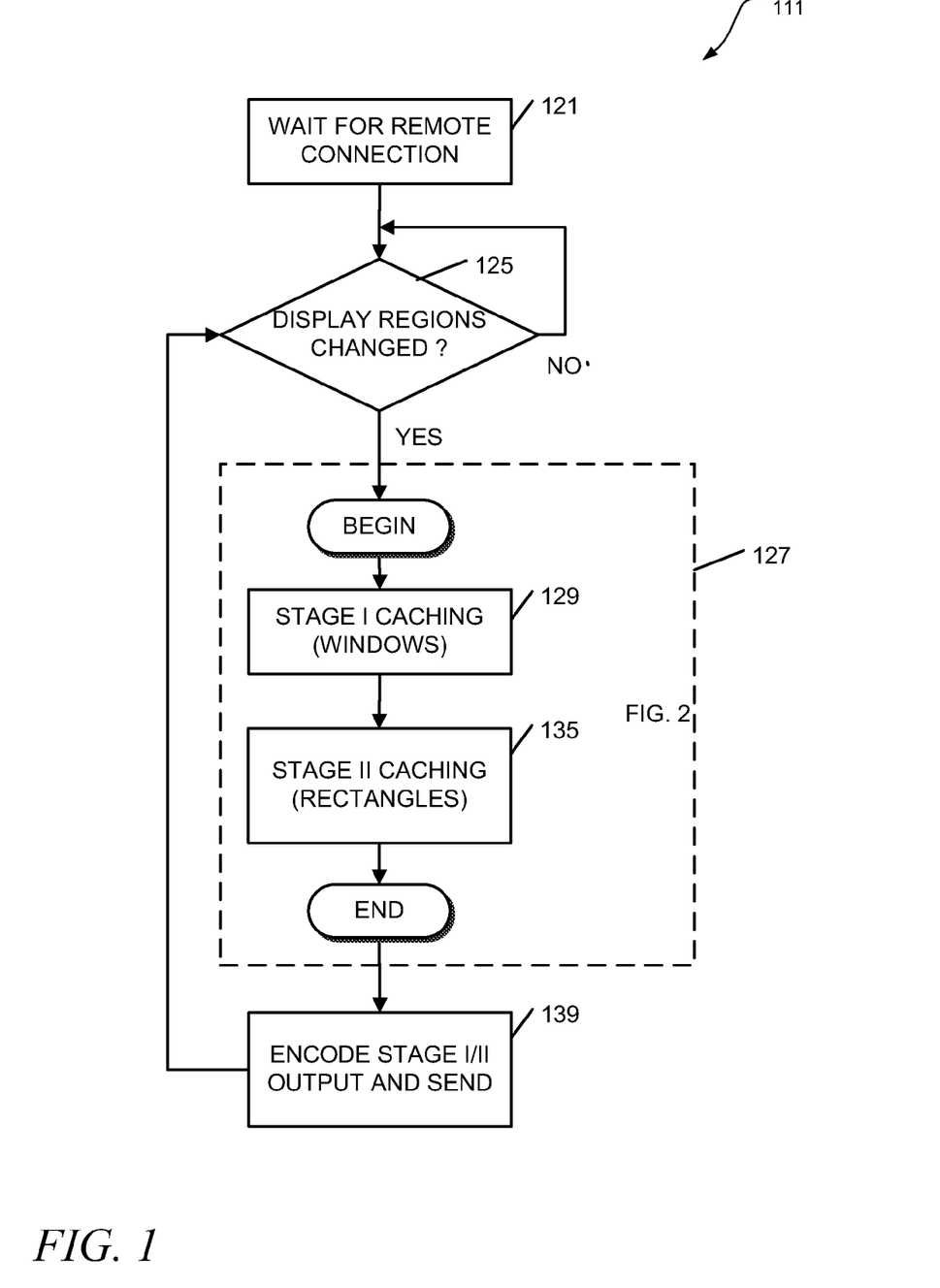
FIG. 1 is a flow diagram illustrating adaptive display caching methods according to various embodiments of the invention.

FIG. 1 is a flow diagram illustrating adaptive display caching methods 111 according to various embodiments of the invention. The methods 111 are implemented in a machine-accessible and readable medium. The methods 111 are operational over processes within and among networks. The networks may be wired, wireless, or a combination of wired and wireless. The methods 111 may be implemented as instructions, which when accessed by a specific machine, perform the processing depicted in FIG. 1. Given this context, adaptive display caching is now discussed with reference to FIG. 1.

In some embodiments, a computer-implemented method 111 for implementing adaptive display caching may begin at block 121 with waiting for a connection to be established between two processes, one being local, and one being remote. The local process may comprise a controlled desktop application, or series of applications, perhaps hosted on a server device. The remote process may comprise a controlling desktop application, or series of applications, perhaps hosted by a client device. Both processes may reside on separate machines, or on the same machine.

After a connection with the remote process (e.g., the controlling desktop) is established, the method 111 may proceed to block 125, with determining whether any display regions of the remote process desktop have changed. If not, the method 111 may continue to wait in a loop on block 125. If changes are detected, then the method 111 may proceed on to the process shown in block 127.

Block 127 is a simplified view of the two-stage caching process that can be utilized in many embodiments of the invention. Each stage may operate sequentially and use a different caching technique. In some cases, only one stage will be operative, depending on the underlying network bandwidth and the type of display changes that are to be communicated to the client.

At block 129, in stage 1, the granularity of caching is at the window level. This stage is typically executed after the prior FBU has been sent, and a new change is detected. The number of windows to be cached can be configured, perhaps within limits, such as some number between 2 and 10.

The cache buffer on the VNC server side may be used to store, for each window: the window handle, the metadata incorporated into a least recently used algorithm, and the current state of the window (minimized, maximized, moved, closed, etc.). The Cache buffer on the VNC viewer side may be used to store, for each window, the handle of the window, and pixel data of the entire window. The window handle may be cached as a hash value, and data specific to the handle (e.g., where the handle is used as a pointer to the specific data) may also be cached.

As part of the stage 1 activity in block 129, the following may be performed for each foreground window:
  Check if the window is already in the server window cache buffer. If so, send a Copyrect message to the VNC Client with the handle of the window and position where the window is to be copied.
  Otherwise, there is no cache hit, and the window handle and metadata are cached (e.g., using a least recently used algorithm if the buffer is full). The handle, metadata, and window pixel data are sent to the client, perhaps accompanied by a message to synchronize the server and client cache buffers. The cache synchronization message may include a list of windows to be removed from client cache. After receiving the message, the client will update its window cache accordingly.

The server may then iterate through all the cached windows and check to determine whether any of the windows are closed or resized (e.g., minimized/maximized). If so, then these windows can be purged from the server cache buffer and a buffer synchronization message can be sent to the client.

After completing stage 1 at block 129, the method 111 may proceed on to stage 2 at block 135. Stage 2 caching operates to further divide changed regions (e.g., as determined by the mirror/video driver) into smaller rectangles, such as some multiple of 2×2, including 4×4, 6×6, 8×8, 10×10, 12×12, 14×14, 16×16, and so on. As noted previously, stage 2 caching is typically implemented when insufficient bandwidth between the server and client exists, and when there have been changes on the basis of less than an entire window.

During the activities of stage 2, the server may operate to request the mirror/video driver to obtain information regarding changed display areas that are to be sent to the client. The changed areas can then be divided into smaller areas, perhaps into 16×16 rectangles.

The handle may be cached as a hash value, and data specific to the handle (e.g., where the handle is used as a pointer to the specific data) may also be cached. For example, the handle hash value used in stage 2 may be used to reference small rectangles that have been cached.

Thus, a hash code may be calculated for each of the smaller rectangles. The hash code value for each changed rectangle may reside in a table at the remote node and act as a pointer or key into the remote cache, perhaps using a multimap data structure comprising key value pairs, as is well known to those of ordinary skill in the art.

The server may operate to determine whether the hash value for each rectangle is already cached and if so, there is a cache hit, and the hash value (e.g., handle) is sent to the client, along with the rectangle paint command.

If the hash value is not in the cache, then it can be stored in the cache using an adaptive replacement cache algorithm and the rectangle pixel data is sent to the client (usually in encoded form) along with the hash code for that rectangle.

During the activities of stage 2, the client may operate in a manner similar to that of stage 1. That is, information will be received with respect to a separate rectangle cache that is maintained according to the information received from the server. Either handle and location data will be received, or handle data and pixel data will be received. Each is dealt with in a similar fashion to the corresponding window data operations of stage 1.

The window pixel data sent to the remote node can be encoded to take advantage of compression techniques, so that sending window pixel data or rectangle pixel data may comprise sending encoded window pixel data or encoded rectangle pixel data, respectively. Thus, once the operations of stage 1 and stage 2 are complete, the method 111 may proceed on to block 139 with encoding window and rectangle pixel output from each stage as needed, so that it can be transmitted to the client. For windows and rectangles associated with cache hits, no pixel data is sent to the remote node. However, window/rectangle identification information and new location data may be sent, depending on the particular changes encountered.

In some embodiments, implementation of the two-stage mechanism increases the cache hit ratio by about 70% when compared to ordinary RFB caching, since smaller rectangles are cached, so the probability of obtaining cache hits is increased, especially during scrolling operations.

The two-stage mechanism also tends to fix the upper limit for memory use, since the cache buffer grows according to the size of the smaller rectangles, times the number of rectangles cached. Confining use of the second stage to those occasions where a lower bandwidth limit cannot be achieved provides balance between the amount of memory used and the cache hit ratio that is achieved.

Figure 2:
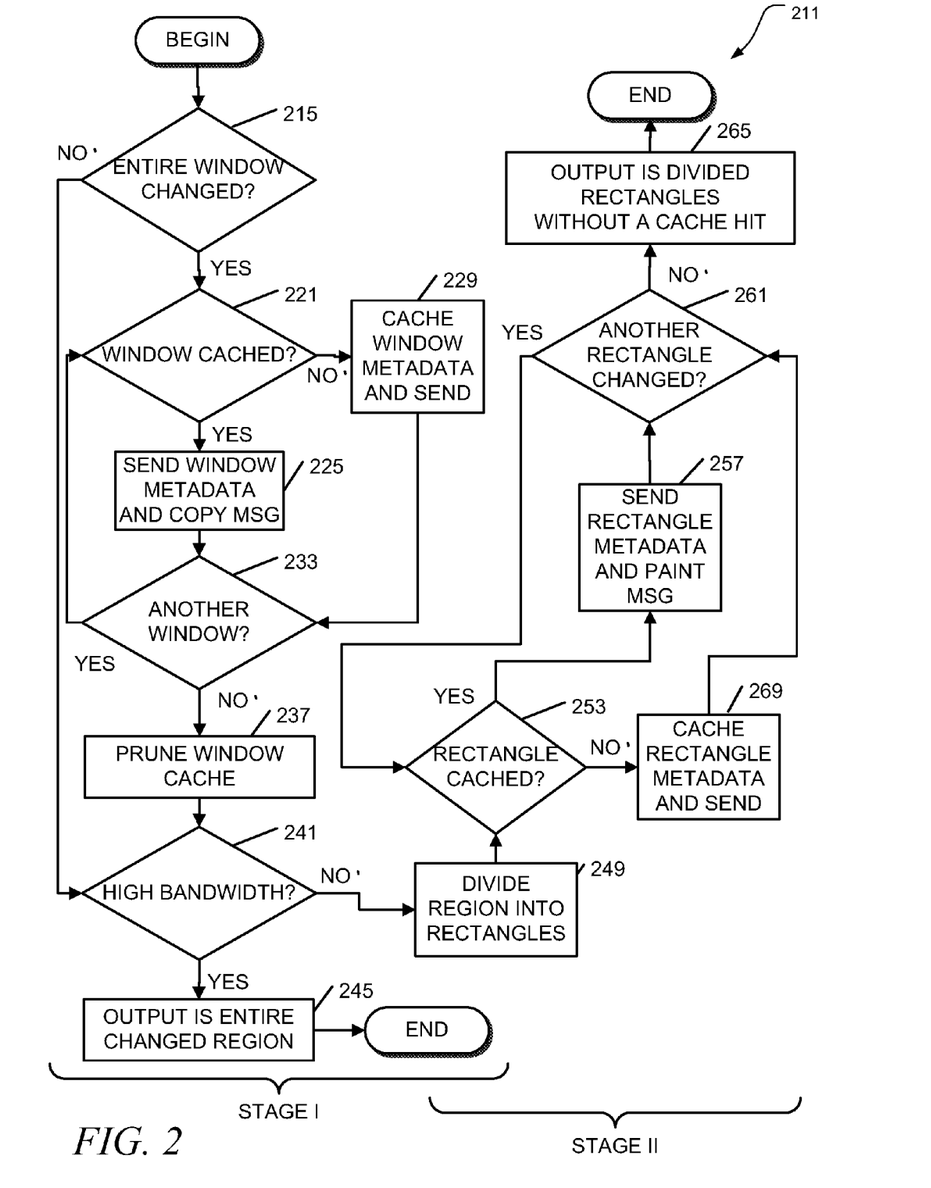
FIG. 2 is another flow diagram illustrating adaptive display caching methods according to various embodiments of the invention.

FIG. 2 is another flow diagram illustrating adaptive display caching methods 211 according to various embodiments of the invention. In this case, each stage of the adaptive display caching mechanism is described in more detail. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

Thus, in some embodiments, to implement adaptive display caching, a processor-implemented method to execute on one or more processors that perform the method 211 may begin at block 215 with determining whether an entire window has changed (e.g., the window has moved, been minimized, been maximized, or closed). To determine whether a window or rectangle has changed, a mirror driver or a video driver can be accessed. Thus, the method 211 may include obtaining information from one of a mirror driver or a video driver to determine whether at least a changed rectangle exists.

If less than an entire window has changed, and sufficient bandwidth exists (e.g., when a preselected minimum bandwidth connection is available between a local node (e.g., server) and a remote node (e.g., client)), then the entire changed region is sent as the output of stage 1 as part of block 245, and stage 2 is not used. If sufficient bandwidth does not exist (e.g., when the preselected minimum bandwidth connection is not available between the local node and the remote node), then the method 211 continues on to block 249 of stage 2.

If the entire window has changed, as determined at block 215, then the method 211 may continue on to block 221 to determine if the window has been cached. If so, then the window metadata and a copy message can be sent to the remote node from the local node at block 225. Thus, the method 211 may include sending a window copy message including changed window identification information to a remote node when window metadata associated with a changed foreground window at a local node has been cached.

One possible form of the window copy message that can be used includes the Copyrect function. Thus, the activity at block 225 may include sending a window copy message that comprises a Copyrect function.

The window metadata may include cache storage algorithm management information. Thus, the activity at block 225 may comprise storing the window metadata in the cache buffer, the window metadata comprising information to maintain the cache buffer using an adaptive replacement cache algorithm, for example.

Thus, in some embodiments, when window metadata associated with a changed foreground window at a local node has been cached (as determined at block 221), the method 211 may also include receiving a window copy message including changed window identification information at the remote node.

If the window metadata has not been cached, then the window metadata can be cached at the local node, and the window metadata and a copy message can be sent to the remote node from the local node at block 229. Thus, the method 211 may include locally caching the window metadata and sending the window metadata (and window pixel data) to the remote node without locally caching the window pixel data when the window metadata has not been cached. In some embodiments then, the method 211 may include receiving the window metadata (and window pixel data) at the remote node.

Regardless of the outcome of block 221, the method 211 may continue on to block 233 to determine whether another window exists to be evaluated on the local node. If so, the process of stage 1 can loop back to block 221. If not, then any windows that have been closed can be pruned from the local node cache, and a cache synchronization message can be sent to the remote node at block 237.

The cache synchronization message can be used to synchronize the content of the local and remote node cache buffer memories. This will purge the remote node cache of window metadata that is no longer in the local node cache. Thus, the method 211 may also include sending a cache synchronization message to the remote node with the window pixel data.

Thus, the remote node can receive buffer synchronization messages from the local node with respect to windows that have been closed or resized (such that the cached data is no longer useful, and perhaps should be purged). The method 211 may thus comprise receiving, at the remote node, a buffer synchronization message in conjunction with the window pixel data. The method 211 may further include purging windows from a cache buffer at the remote node in response to receiving the buffer synchronization message.

From block 237, the method 211 may continue on to block 241. If there is sufficient bandwidth, any changed windows that were not cached can now be designated for sending as pixel data to the remote node as part of block 245, at which point stage 1 processing ends.

From block 241, when windows have changed, and insufficient bandwidth exists, the method 211 may continue on to block 249, such that areas of change within a window can be divided into smaller rectangles, such as 16×16 rectangles. That is, changed rectangles can be divided into a series of smaller rectangles, perhaps prior to calculating hash values, as noted below. Thus, the activity at block 249 may comprise dividing the changed rectangle into multiple smaller rectangles.

The method 211 may continue on to block 253, to determine whether the rectangle metadata has been cached. If so, then the method 211 may continue on to block 257 with sending the rectangle metadata and a rectangle paint message to the remote node at block 257. Thus, the method 211 may include sending a rectangle paint message including changed rectangle identification information to the remote node when a preselected minimum bandwidth connection is not available between the local node and the remote node, and rectangle metadata associated with a changed rectangle of a designated minimum size at the local node has been cached. In some embodiments then, the method 211 may include (when a preselected minimum bandwidth connection is not available between the local node and the remote node, and rectangle metadata associated with a changed rectangle of a designated minimum size at the local node has been cached) receiving a rectangle paint message including changed rectangle identification information at the remote node.

The size of the rectangles that are cached can be any size, including multiples of 2×2 pixels, such as 4×4 pixels, 6×6 pixels, 8×8 pixels, 16×16 pixels, or 32×32 pixels, among others. Thus, the designated minimum rectangle size can be a multiple of approximately 2×2 pixels. In some embodiments, this size is selectable to provide different levels of granularity.

If the changed, subdivided rectangle metadata has not been cached, then the method 211 may continue from block 253 on to block 269 with caching the rectangle metadata, and then sending the rectangle metadata on to the remote node. Thus, the method 211 may include locally caching the rectangle metadata and sending the rectangle metadata (and rectangle pixel data) to the remote node without locally caching the rectangle pixel data when the rectangle metadata has not been cached. In some embodiments then, the method 211 may include (when the rectangle metadata has not been cached) receiving the rectangle metadata and rectangle pixel data at the remote node.

Many algorithms can be used to guide how rectangle metadata is stored in the cache buffer, including a least recently used (LRU) cache algorithm, or an adaptive replacement cache algorithm. Thus, locally caching the rectangle metadata may comprise storing the rectangle metadata in a cache buffer using an adaptive replacement cache algorithm.

The remote node cache buffer can be used to store the changed rectangle identification information to identify one or more portions of the changed rectangle, and the corresponding rectangle pixel data. Thus, the method 211 may further include maintaining a cache buffer at the remote node, the cache buffer to store the changed rectangle identification information and the rectangle pixel data.

Hash codes can be used to identify individual rectangles that are to be cached at the remote node. Therefore, once a changed rectangle has been subdivided (which typically occurs if it is larger than the designated minimum size), hash codes for each portion can be calculated. Thus, the activity at block 269 may further comprise calculating a hash code for at least a portion of the changed rectangle when the rectangle metadata has not been cached.

The method 211 may therefore also comprise receiving the rectangle pixel data along with a hash code of the rectangle pixel data. The method 211 may further include storing the hash code associated with the rectangle pixel data in a cache buffer as a key to identify at least a portion of the changed rectangle.

Regardless of the outcome at block 253, the method 211 may continue on to block 261 to determine whether additional areas (smaller than a window) have changed. If so, then the method 211 may loop back to block 253. If not, then the method 211 may continue on to block 265 with designating subdivided rectangles to be sent as pixel data after stage 2 processing is completed.

In summary, in some embodiments, the method 211, as viewed from activity at the local node, such as a server, involves two parts. In stage 1, for a window that has changed (minimized, maximized, or moved), a window copy message and window ID information is sent to the remote node when the changed window metadata has been cached. If it hasn't been cached, then the metadata is locally cached and sent, along with the window pixel data (usually in encoded form) to the remote node. In stage 2, for a low speed connection, and a subdivided rectangle that has changed, a rectangle paint message and rectangle identification information is sent to the remote node when the changed rectangle metadata has been cached. If the subdivided rectangle hasn't been cached, then the rectangle metadata is locally cached and sent, along with the rectangle pixel data (typically encoded) to the remote node. For a high speed connection, stage 2 is not used and changed windows, or changed, subdivided rectangles are simply sent as pixel data to the local node encoder for transmission to the remote node, without caching the pixel data at the local node.

The methods of managing file access shown in FIGS. 1 and 2 can be implemented in a computer-readable storage medium, where the methods are adapted to be executed by a processor. Further details of such embodiments will be provided below.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

Figure 3:
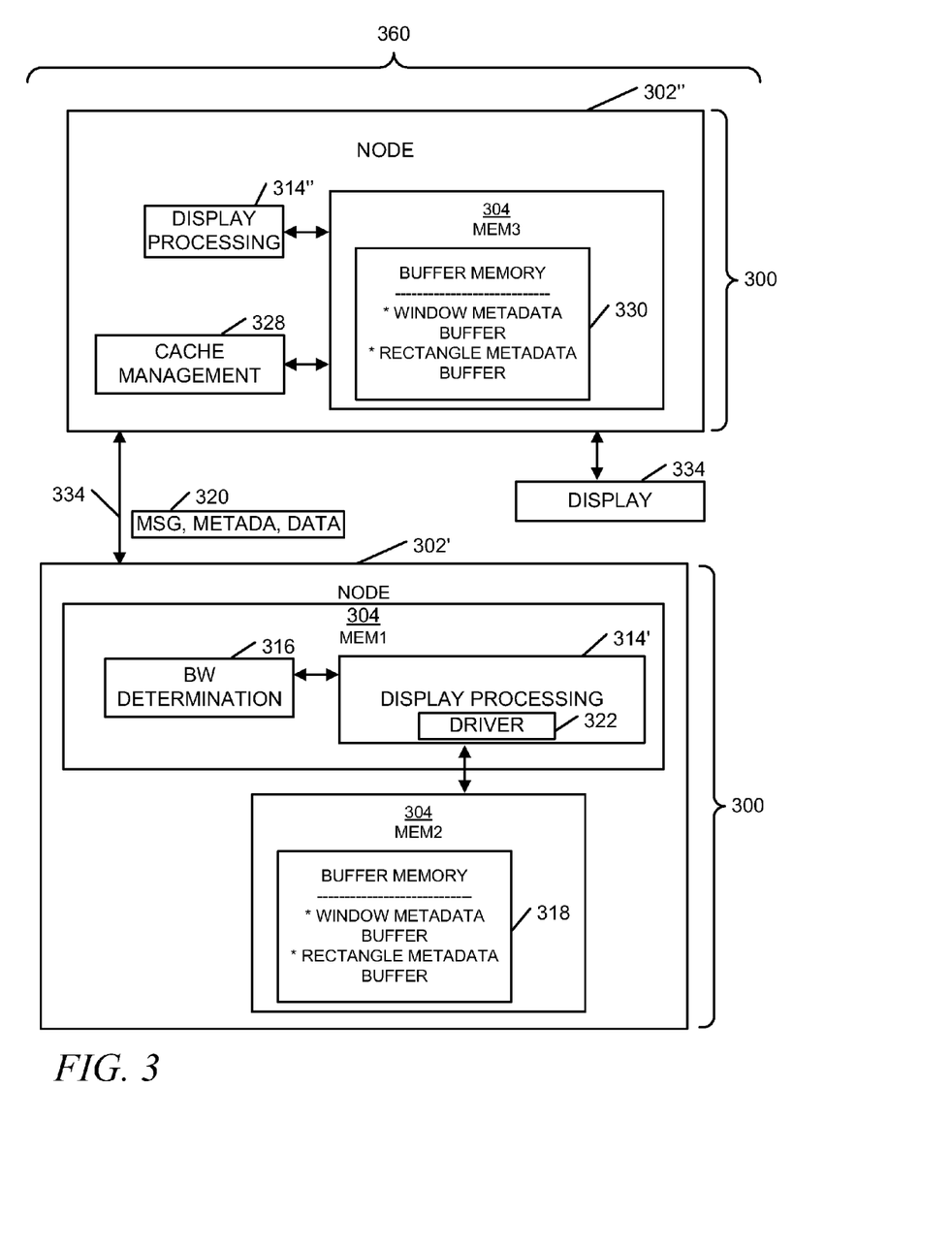
FIG. 3 is a block diagram of adaptive display caching apparatus and systems according to various embodiments of the invention.

For example, FIG. 3 is a block diagram of adaptive display caching apparatus 300 and systems 360 according to various embodiments of the invention. Here it can be seen that an apparatus 300 used to implement adaptive display caching may comprise one or more nodes 302' that have a local cache display buffer memory 318 and a local display processing module 314'. The apparatus might comprise a VNC server, for example, and the display processing module 314' may include a driver 322, such as a mirror driver or a video driver.

The display processing module 314' may operate to send information 320 including a window copy message with changed window identification information to a remote node 302" when window metadata associated with a changed foreground window at the local node 302' housing the local cache display buffer memory 318 has been cached in the memory 318. And when the window metadata has not been cached in the memory 318, the display processing module 314' may operate to locally cache the window metadata in the memory 318 and to send information 320 including window metadata and window pixel data to the remote node 302" (without locally caching the window pixel data).

When a preselected minimum bandwidth connection is not available between the local node 302' and the remote node 302", and rectangle metadata associated with a changed rectangle of a designated minimum size at the local node has been cached in the memory 318, the display processing module 314' can operate to send information 320 include a rectangle paint message with changed rectangle identification information to the remote node 302", and when the rectangle metadata has not been cached in the memory 318, the display processing module 314' can operate to locally cache the rectangle metadata in the memory 318 and to send information 320 including the rectangle metadata and rectangle pixel data to the remote node 302" without locally caching the rectangle pixel data.

In some embodiments, the apparatus 300 may comprise a bandwidth determination module 316 to determine whether the preselected minimum bandwidth connection is available (e.g., via the communications path 334). The buffer memory 318 may be maintained as a single cache buffer, or as two separate cache buffers. Thus, in some embodiments, the memory 318 may comprise a window buffer to cache the window metadata, and a rectangle buffer to cache the rectangle metadata. Other embodiments may be realized.

For example, an apparatus 300 to implement adaptive display caching may comprise one or more nodes 302" having a remote cache display buffer memory 330 and a remote display processing module 314". The display processing module 314" may operate to receive information 320 comprising a window copy message including changed window identification information at a remote node 302" housing the remote cache display buffer memory 330 when window metadata associated with a changed foreground window at a local node 302' has been cached in the memory 330. The display processing module 314" may operate to receive the information 320 comprising window metadata and window pixel data at the remote node 302" when the window metadata has not been cached in the memory 330.

When a preselected minimum bandwidth connection is not available between the local node 302' and the remote node 302", and rectangle metadata associated with a changed rectangle of a designated minimum size at the local node 302' has been cached in the memory 330, the display processing module 314" may operate to receive information 320 comprising a rectangle paint message including changed rectangle identification information at the remote node 302", and when the rectangle metadata has not been cached in the memory 330, the display processing module 314" may operate to receive the information 320 comprising rectangle metadata and rectangle pixel data at the remote node 302".

In most embodiments, the apparatus 300 comprises a display 334 to display the changed foreground window. The apparatus 300 may also comprise one or more cache management modules 328 to manage the remote cache buffer display memory 330 according to a variety of algorithms, such as an adaptive replacement cache algorithm.

The processing nodes 302 may comprise physical machines or virtual machines, or a mixture of both. The nodes 302 may also comprise networked entities, such servers and/or clients. Still further embodiments may be realized.

For example, it can be seen that an adaptive display caching system 360 may comprises multiple instances of the apparatus 300. The system 360 might comprise a cluster of nodes 302, including a mixture of physical and virtual nodes.

The adaptive display caching apparatus 300 and system 360 may be implemented in a machine-accessible and readable medium that is operational over one or more networks (e.g., included in communication paths 334). The networks may be wired, wireless, or a combination of wired and wireless. The adaptive display caching apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
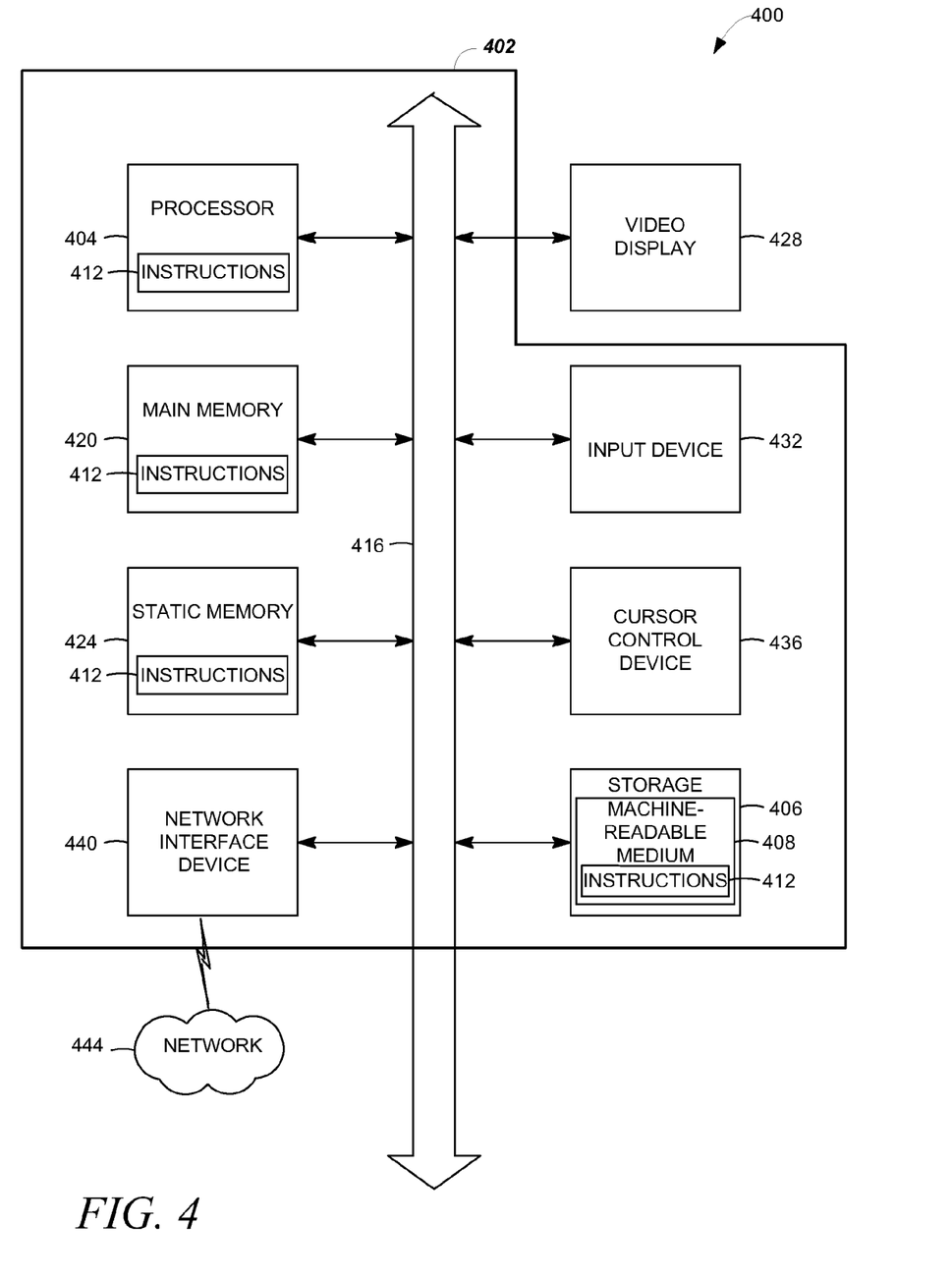
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, among others, capable of executing a set of instructions (sequential or otherwise) that specify actions to be taken by that machine. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to exploit available graphics display data more efficiently, improving display buffer cache hit ratios. Further, the transfer of information between nodes can be dynamically tailored according to the underlying network bandwidth. In addition, data that has a lower likelihood of getting a cache hit can be left out of the cache, and unused data can be detected dynamically, and purged. More efficient allocation of overall processing resources may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
    a local cache display buffer memory; and
    a local display processing module that, when window metadata associated with a changed foreground window at a local node housing the local cache display buffer memory has been cached in the memory, operates to send a window copy message including changed window identification information to a remote node, and when the window metadata has not been cached in the memory, operates to locally cache the window metadata in the memory and to send the window metadata and window pixel data to the remote node without locally caching the window pixel data; and
    when a preselected minimum bandwidth connection is not available between the local node and the remote node, and rectangle metadata associated with a changed rectangle of a designated minimum size at the local node has been cached in the memory, operates to send a rectangle paint message including changed rectangle identification information to the remote node, and when the rectangle metadata has not been cached in the memory, operates to locally cache the rectangle metadata in the memory and to send the rectangle metadata and rectangle pixel data to the remote node without locally caching the rectangle pixel data.

2. The apparatus of claim 1, further comprising:
    a bandwidth determination module to determine whether the preselected minimum bandwidth connection is available.

3. The apparatus of claim 1, wherein the memory further comprises:
    a window buffer to cache the window metadata; and
    a rectangle buffer to cache the rectangle metadata.

4. An apparatus, comprising:
    a remote cache display buffer memory; and
    a remote display processing module that, when window metadata associated with a changed foreground window at a local node has been cached in the memory, operates to receive a window copy message including changed window identification information at a remote node housing the remote cache display buffer memory, and when the window metadata has not been cached in the memory, operates to receive the window metadata and window pixel data at the remote node; and when a preselected minimum bandwidth connection is not available between the local node and the remote node, and rectangle metadata associated with a changed rectangle of a designated minimum size at the local node has been cached in the memory, operates to receive a rectangle paint message including changed rectangle identification information at the remote node, and when the rectangle metadata has not been cached in the memory, operates to receive the rectangle metadata and rectangle pixel data at the remote node.

5. The apparatus of claim 4, further comprising:
a display to display the changed foreground window.

6. The apparatus of claim 4, further comprising:
a cache management module to manage the remote cache buffer display memory using an adaptive replacement cache algorithm.

7. A processor-implemented method to execute on one or more processors that perform the method, comprising:
when window metadata associated with a changed foreground window at a local node has been cached, sending a window copy message including changed window identification information to a remote node, and when the window metadata has not been cached, locally caching the window metadata and sending the window metadata and window pixel data to the remote node without locally caching the window pixel data; and
when a preselected minimum bandwidth connection is not available between the local node and the remote node, and rectangle metadata associated with a changed rectangle of a designated minimum size at the local node has been cached, sending a rectangle paint message including changed rectangle identification information to the remote node, and when the rectangle metadata has not been cached, locally caching the rectangle metadata and sending the rectangle metadata and rectangle pixel data to the remote node without locally caching the rectangle pixel data.

8. The method of claim 7, further comprising:
sending a cache synchronization message to the remote node with the window pixel data.

9. The method of claim 7, wherein the window copy message comprises a copyrect function.

10. The method of claim 7, further comprising:
obtaining information from one of a mirror driver or a video driver to determine whether at least the changed rectangle exists.

11. The method of claim 7, wherein the designated minimum size is a multiple of approximately 2×2 pixels.

12. The method of claim 7, wherein sending the window pixel data comprises:
sending encoded window pixel data.

13. The method of claim 7, wherein locally caching the rectangle metadata comprises:
storing the rectangle metadata in a cache buffer using an adaptive replacement cache algorithm.

14. The method of claim 7, further comprising:
dividing the changed rectangle into multiple smaller rectangles.

15. The method of claim 7, further comprising:
calculating a hash code for at least a portion of the changed rectangle when the rectangle metadata has not been cached.

16. The method of claim 7, further comprising:
maintaining a cache buffer at the local node, the cache buffer to store a window handle associated with the window pixel data and a current state of the changed foreground window.

17. The method of claim 16, further comprising:
storing the window metadata in the cache buffer, the window metadata comprising information to maintain the cache buffer using an adaptive replacement cache algorithm.

18. A processor-implemented method to execute on one or more processors that perform the method, comprising:
when window metadata associated with a changed foreground window at a local node has been cached, receiving a window copy message including changed window identification information at a remote node, and when the window metadata has not been cached, receiving the window metadata and window pixel data at the remote node; and
when a preselected minimum bandwidth connection is not available between the local node and the remote node, and rectangle metadata associated with a changed rectangle of a designated minimum size at the local node has been cached, receiving a rectangle paint message including changed rectangle identification information at the remote node, and when the rectangle metadata has not been cached, receiving the rectangle metadata and rectangle pixel data at the remote node.

19. The method of claim 18, further comprising:
maintaining a cache buffer at the remote node, the cache buffer to store the changed rectangle identification information and the rectangle pixel data.

20. The method of claim 18, further comprising:
storing a hash code associated with the rectangle pixel data in a cache buffer as a key to identify at least a portion of the changed rectangle.

21. The method of claim 18, further comprising:
receiving the rectangle pixel data along with a hash code of the rectangle pixel data.

22. The method of claim 18, further comprising:
receiving, at the remote node, a buffer synchronization message in conjunction with the window pixel data.

23. The method of claim 22, further comprising:
purging windows from a cache buffer at the remote node in response to receiving the buffer synchronization message.

* * * * *